(12) United States Patent
Huang et al.

(10) Patent No.: US 8,085,712 B2
(45) Date of Patent: Dec. 27, 2011

(54) METHOD FOR IMPLEMENTING MEDIA GATEWAY FUNCTION, RADIO ACCESS CONTROL DEVICE AND RADIO ACCESS SYSTEM

(75) Inventors: Tianzhen Huang, Guangdong (CN); Ming Lin, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1159 days.

(21) Appl. No.: 11/844,481

(22) Filed: Aug. 24, 2007

(65) Prior Publication Data

US 2008/0049705 A1    Feb. 28, 2008

Related U.S. Application Data

(63) Continuation of application No. PCT/CN2006/000281, filed on Feb. 27, 2006.

(30) Foreign Application Priority Data

Feb. 25, 2005    (CN) .......................... 2005 1 0051044

(51) Int. Cl.
*H04W 4/00* (2009.01)
(52) U.S. Cl. ................. 370/328; 370/338; 370/342
(58) Field of Classification Search .................. None
See application file for complete search history.

(56) References Cited

U.S. PATENT DOCUMENTS

| | | | |
|---|---|---|---|
| 2003/0012154 A1* | 1/2003 | Musikka | 370/328 |
| 2004/0030791 A1* | 2/2004 | Dorenbosch et al. | 709/230 |
| 2004/0204095 A1* | 10/2004 | Cyr et al. | 455/560 |
| 2004/0260784 A1* | 12/2004 | Lee et al. | 709/217 |
| 2005/0157726 A1* | 7/2005 | Vesterinen | 370/395.5 |
| 2005/0170816 A1* | 8/2005 | Pelaez et al. | 455/412.2 |
| 2008/0075115 A1* | 3/2008 | Brendes et al. | 370/467 |

FOREIGN PATENT DOCUMENTS

| | | |
|---|---|---|
| CN | 1571418 A | 1/2005 |
| KR | 20020043434 A | 6/2002 |
| KR | 20030054009 A | 7/2003 |

OTHER PUBLICATIONS

Foreign communication from a counterpart application, PCT application PCT/CN2006/000281, International Preliminary Report on Patentability dated Aug. 28, 2007, 4 pages.
Foreign communication from a counterpart application, PCT application PCT/CN2006/000281, International Search Report dated May 25, 2006, 2 pages.

* cited by examiner

*Primary Examiner* — Anthony Sol
(74) *Attorney, Agent, or Firm* — Conley Rose, P.C.; Grant Rodolph (57) ABSTRACT

A method for implementing the media gateway function is disclosed by the embodiment of the present invention, including: receiving a first signaling message; determining to perform a processing of a base station application layer or a processing of a media gateway control application layer according to a Simple Control Transmission Protocol (SCTP) link, wherein the SCTP link is indicated by the first signaling message; if determine to perform the processing of the media gateway control application layer, routing traffic data to a destination device. A radio access control device and a radio access system according to the above mentioned method are further disclosed. According to the embodiment of the present invention, the exchange number of an IP packet is reduced, and the bearer is separated from the control.

2 Claims, 6 Drawing Sheets

METHOD FOR IMPLEMENTING MEDIA GATEWAY FUNCTION, RADIO ACCESS CONTROL DEVICE AND RADIO ACCESS SYSTEM

FIELD OF THE INVENTION

The present invention generally relates to radio communication technology, and particularly, to a method for a radio access control device implementing media gateway function, a radio access control device and a radio access system.

BACKGROUND OF THE INVENTION

In the mobile communication network including Wideband Code Division Multiple Access (WCDMA) network and Code Division Multiple Access 2000 (CDMA 2000) network, the core network of circuit domain adopts an architecture separating bearer from control; Mobile Switching Center (MSC) has been divided into a Mobile Soft-switch device and a Media Gateway (MGW); and IP bearer network is generally used for a bearer between network entities in the mobile communication network. All IP network has become a trend in the industry.

In the CDMA2000 network, the MSC is divided into a Mobile Switching Center emulation (MSCe) and the MGW; In the WCDMA network, the MSC is divided into an MSC server and the MGW. And in the CDMA2000 network, the network radio access control device is a Base Station Controller (BSC); in the WCDMA network, the network radio access control device is a BSC or Radio Network Controller (RNC).

In the following, the CDMA2000 network is hereinafter described as an example, which is the same as the WCDMA network apart from the different entity names.

Figure 1:
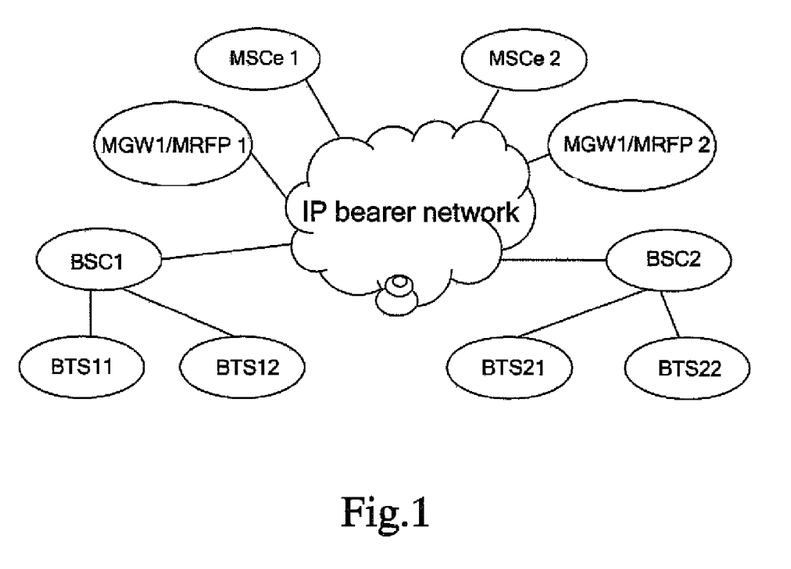
FIG. 1 is a schematic diagram illustrating the physical architecture of CDMA2000 network.

FIG. 1 is a schematic diagram illustrating the physical architecture of CDMA2000 network. A Media Resource Function Processor (MRFP) and an MGW are generally combined within one physical entity; an MSCe, MGW, BSC and MRFP/MGW generally access the IP bearer network via routers to implement the interworking between each other.

Figure 2:
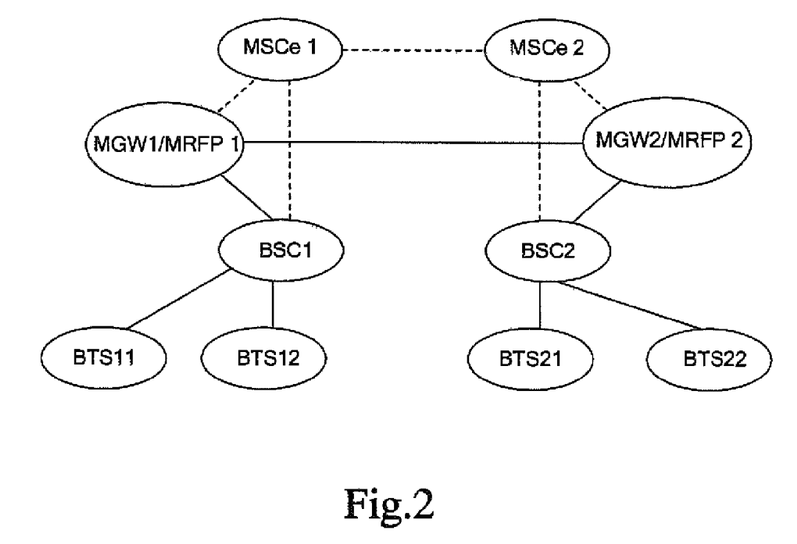
FIG. 2 is a schematic diagram illustrating the logical architecture of CDMA2000 network.

FIG. 2 is a schematic diagram illustrating the logical architecture of CDMA2000 network. In FIG. 2, the dashed line represents a signaling connection and the solid line represents a traffic data connection.

In FIG. 2, the signaling connection is mainly located between MSCes, between MSCe and MGW, and between MSCe and BSC; the traffic data connection is mainly located between BSC and MGW, and between MGWs, and the data connection between BSCs is implemented via the MGW.

A procedure of transmitting traffic data in FIG. 2 is hereinafter described. MS1 within the coverage area of BTS11 communicates with MS2 within the coverage area of BTS22. After a signaling interaction, BSC1 teams that the traffic data received from BTS11 will be transmitted to MGW1; then MGW1 learns that the traffic data received from BSC1 will be transmitted to MGW2; and MGW2 learns that the traffic data received from MGW1 will be transmitted to BSC2. As a result, in the traffic plane, after receiving the traffic data sent by MS1, BSC1 sends the traffic data to MGW1 after adding the IP address of MGW1 to the traffic data; MGW1 sends the traffic data to MOW2 after modifying the IP address of MGW1 into the IP address of MGW2; MGW2 sends the traffic data to BSC2 after modifying the IP address of MGW into the IP address of BSC2; at last, BSC2 delivers the traffic data from BTS22 to MS2.

As shown in the above description, signaling and traffic data of CDMA2000 system are all carried by IP. For the traffic data transmitted by IP between BSC and MGW, and between MGWs, the destination IP of traffic data may be directly designated in BSC and the traffic data may be routed according to the IP, since each entity takes IP as its bearer and the media access method is simple. Therefore, the forwarding function of media gateway is of no particular significance, but increases the switch number of an IP packet and wastes the system resource.

Figure 3:
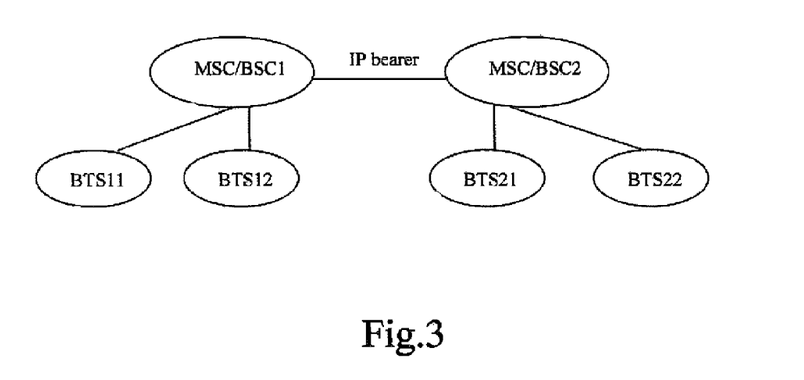
FIG. 3 is a schematic diagram illustrating the physical architectural for combining MSC and BSC.

At present, a manufacturer of industry provides architecture for combining MSC with BSC device and setting an IP interface, which is shown in FIG. 3. FIG. 3 is a schematic diagram illustrating the physical architecture for combining MSC with BSC. Referring to FIG. 3, although this architecture embodies IP bearer, reduces the switch number of an IP packet and has the advantage of low cost, the operator is unable to select the device of manufacturer having the service advantage and the device of manufacturer having the radio advantage to implement the design with optimization, because the MSC and the BSC device are combined into one device and A-Interface between MSC and BSC is unable to be open.

In addition, combining MSC with BSC device is unable to embody the advantage of separating bearer from control. For example, when bearer is separated from control, an MSCe may manage multiple MGWs, and it is only necessary for upgrading a few site MSCe to add service support; however, it is necessary for upgrading all MSC/BSC combination devices in the case of combining MSC with BSC device, which improves the complexity for maintaining a system and increases the cost for maintaining a system.

SUMMARY OF THE INVENTION

Embodiments of the present invention provide a method for implementing media gateway function, and also provide a radio access control device having the media gateway function, and a radio access system.

The method for implementing media gateway function includes: receiving a first signaling message;

determining to perform a processing of a base station application layer or a processing of a media gateway control application layer according to an SCTP link, wherein the SCTP link is indicated by the first signaling message;

if determine to perform the processing of the media gateway control application layer, routing traffic data to a destination device.

The radio access control device includes: a signaling plane comprising an SCTP link layer; wherein the SCTP link layer is configured for determining to transmit a first signaling message received from an external device to the base station application layer or a media gateway control application layer for processing, according to an SCTP link indicated by the first signaling message;

a media gateway control application layer, configured for receiving the first signaling message sent from the SOW link layer, performing a processing of the media gateway application layer;

a traffic plane, configured for routing traffic data to a destination device upon the processing of the media gateway application layer.

The radio access system includes: a radio access control device;

an MSC serving device connected to the radio access control device;

wherein an SCTP link layer of the radio access control device is configured for determining to transmit a first signaling message received from an external device to a base station application layer or a media gateway control application layer of the radio access control device for processing, according to an SCTP link indicated by the first signaling message; and the media gateway control application layer of the radio access control device is configured for receiving the first signaling message sent from the SCTP link layer, performing a processing of the media gateway application layer;

a traffic plane of the radio access control device is configured for routing traffic data to a destination device upon the processing of the media gateway application layer.

DETAILED DESCRIPTION OF THE INVENTION

Embodiments of the invention are hereinafter described in detail with reference to the drawings.

In the embodiments of the present invention, a method for implementing media gateway function, a radio access control device implementing a media gateway function and the radio access system are disclosed. And the radio access control device implements the media gateway function by adding a media gateway control application layer. So the radio access control device routes traffic data to a destination device directly according to the IP address. Since the media gateway device is not required in the system, the exchange number of IP packets is reduced. And since the radio access control device and the MSC serving device are separated, the embodiments of this invention have advantages of separating bearer from control.

Figure 4:
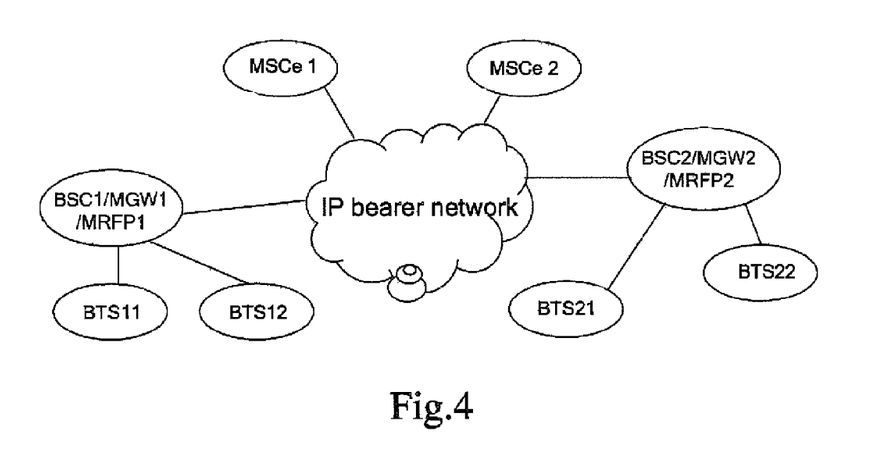
FIG. 4 is a schematic diagram illustrating the physical architecture of a radio access system in accordance with an embodiment of the present invention.

FIG. 4 is a schematic diagram illustrating an architecture of a radio access system in accordance with an embodiment of the present invention. In this embodiment, the functions of BSC and MGW/MRFP are combined into one physical entity still named as BSC. The MSCe and the BSC are connected to the IP bearer network via routers.

Therefore, the MSCe controls the BSC directly; in the case of a mobile user calling another mobile user, a traffic data may be routed from BSC1 to BSC2 directly according to an IP address. In the case of a mobile user calling a fixed user, the traffic data may be routed from BSC1 to Media Gateway of the local Gateway MSC or the fixed network. Since the MGW is not required in the local exchange, it is possible to save network element and reduce exchange number of IP packets.

Figure 5:
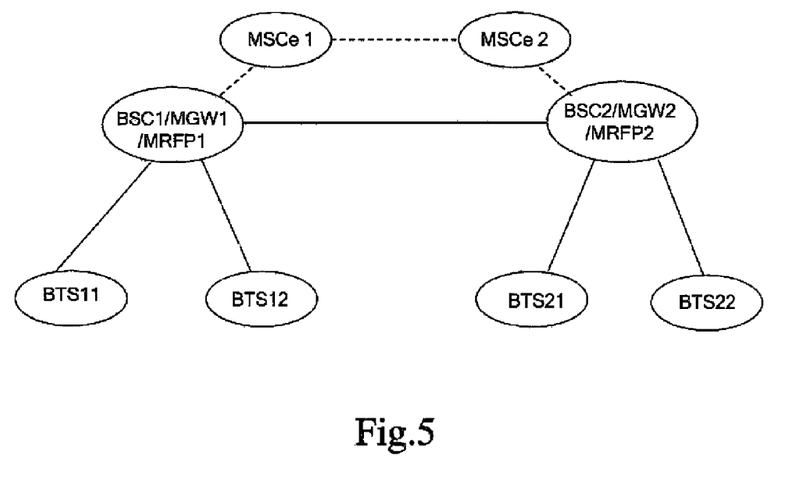
FIG. 5 is a schematic diagram illustrating the logical architecture of the system shown in FIG. 4.

FIG. 5 is a schematic diagram illustrating the logical architecture of the system shown in FIG. 4. In FIG. 5, the dashed line represents signaling connection and the solid line represents traffic data connection. As shown in FIG. 5, the connection between MSCes is mainly signaling connection, the connection between MSCe and BSC is mainly signaling connection too, and connection between BSC and BSC is traffic data connection.

Figure 6:
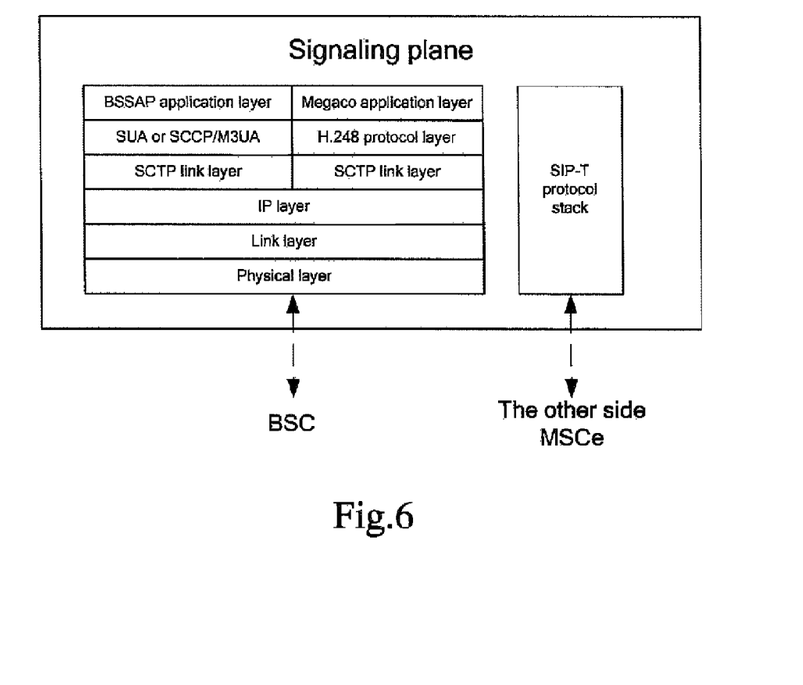
FIG. 6 is a schematic diagram illustrating the logical architecture of MSCe in accordance with the embodiment shown in FIG. 4.

FIG. 6 is a schematic diagram illustrating the logical architecture of the MSCe in this embodiment.

Session Initiated Protocol or SIP for Telephone (SIP/SIP-T) is used to transmit a signaling between MSCes.

The peer protocol stack is applied between the signaling planes (referred to as control plane) of the MSCe and the BSC. The signaling directly transmitted by the MSCe and BSC includes a standard BSSAP application protocol signaling defined by 3GPP2 and a standard ITU-T H.248 signaling for controlling the traffic data interaction. The two kinds of signaling may use same IP address and may be processed by same processor within the BSC.

As can be seen from FIG. 6, the protocol stack of MSCe and BSC, and the protocol stack of MSCe and MGW are combined into a peer protocol stack of MSCe and BSC in this embodiment. In the following embodiments of the present invention, a signaling message passing through the IP layer from an MSCe is a preferred example of a first signaling message, and the signaling message sent by the BSC to the MSCe is a preferred example of a second signaling message.

During processing of the MSCe at BSSAP application layer, the BSSAP application layer creates a signaling message, i.e. IOS: Paging Request, IOS: Assignment Request etc. The signaling message is transmitted to a BSC; after the signaling message is processed by the Signaling Connection Control Part User Adaptation Layer (SUA), Signaling Connection Control Part (SCCP) layer, or Message Transfer Part3—User Adaptation layer (M3UA), an SCTP link is selected (the destination processing layer of the SCTP link is the BSSAP application layer of BSC) and an IP header is added to the signaling message in the IP layer, and the signaling message may be transmitted to a BSC via the link layer and physical layer, wherein a destination address of the signaling message is an IP address and port of the signaling plane of BSC.

The MSCe calls an Megaco application to add a bearer during call processing, and the Megaco application layer creates a signaling message, i.e. Megaco: ADD[Trunk sendrecv] etc. The signaling message is transmitted to a Media Gateway and processed by the H.248 layer. In this embodiment, the media gateway is combined with the BSC, an SCTP link (the destination processing layer of the selected SCTP link is a preset Megaco application layer of BSC) is selected and an IP header is added to the signaling message in the IP layer. The signaling message may be transmitted to a BSC via a link layer and a physical layer wherein the destination address of the signaling message is the IP address and port of the signaling plane of BSC.

Figure 7:
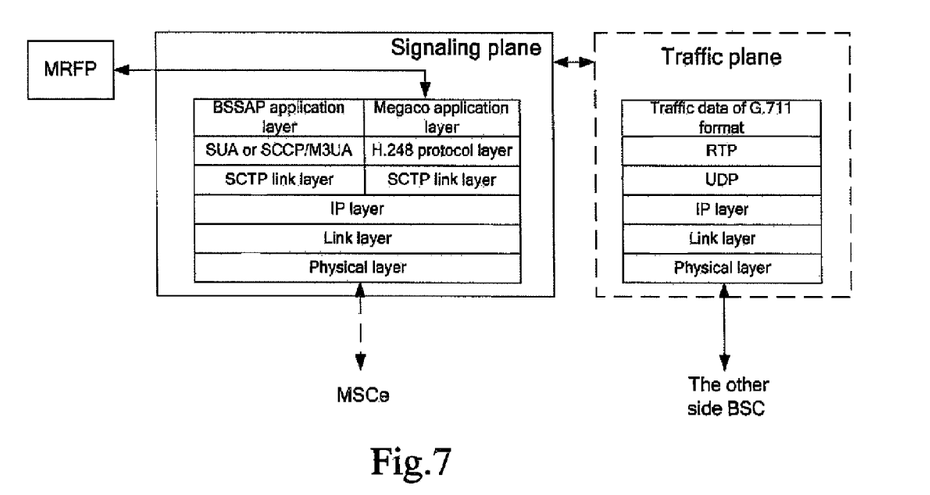
FIG. 7 is a schematic diagram illustrating the logical architecture of BSC in accordance with the embodiment shown in FIG. 4.

FIG. 7 is a schematic diagram illustrating the logical architecture of BSC in accordance with the embodiment as shown in FIG. 4. In a BSC of this embodiment, the MRFP is included; a Megaco application layer is set in the protocol stack of signaling plane. An SCTP link layer and an H.248 protocol layer for the Megaco application layer are added above the IP layer.

The processing of BSC signaling plane at the BSSAP application layer is also the same as the processing in prior art. The BSSAP application layer creates a signaling message, i.e. IOS: CM-Service Request, IOS: Assignment Complete etc, which will be transmitted to an MSCe; after the signaling message is processed by the SUA (or SCCP/M3UA), an SCTP link (the destination processing layer of the selected SCTP link is the BSSAP application layer of MSCe) is selected, an IP header is added to the signaling message in the IP layer, and the signaling message may be transmitted to an MSCe via the link layer and physical layer, wherein a destination address of the signaling message is an IP address of MSCe.

Since a Megaco application layer is added in the BSC, the media gateway processing function is added to the BSC. The BSC determines whether the signaling message passing through the IP layer from an MSCe is a Megaco message or a BSSAP message according to SCTP links, the signaling message is a preferred example of the first signaling message; if the signaling message is a Megaco message, the BSC sends the Megaco message to the H.248 protocol layer for processing, and glen sends the Megaco message to the Megaco application layer for processing; the media gateway processing in the BSC is same as the processing in the media gateway, for example the media gateway processing of allocating the IP address and port of the service bearer. If the signaling message is a BSSAP message, the BSC sends the BSSAP message to the SUA (or SCCP/M3UA) for processing, and then sends the BSSAP message processed to the BSSAP application layer for further processing.

In this embodiment, the method for determining whether the signaling message is a Megaco message or a BSSAP message includes: the BSC determines, according to the source IP address and port as well as the destination IP address and port of the SCTP link indicated by the signaling message, whether the SCTP link indicated by the signaling message is an SCTP link preset for a base station application layer or an SCTP link preset for a media gateway control application layer; if the SCTP link indicated by the signaling message is an SCTP link preset for a base station application layer, the signaling message is a BSSAP message; if the SCTP link indicated by the signaling message is an SCTP link preset for a media gateway control application layer, the signaling message is an Megaco message.

The Megaco application layer of the BSC may also create a signaling message which is a preferred example of the second signaling message, for example Megaco: REPLY[ ]. The signaling message will be transmitted to the MSCe after the signaling message is processed. After the signaling message is processed by the H.248 layer, an SCTP link is selected, the destination address of the signaling message is the IP address of the MSCe, and an IP header is added to the signaling message in the IP layer, so that the signaling message may be transmitted to the MSCe through the link layer and physical layer, wherein the destination address of the signaling message is the IP address of MSCe.

The Megaco application layer sends a media resource request to the MRFP according to the signaling received from the MSCe. The MRFP allocates media resources according to the media resource request, and returns information of the media resources to the Megaco application layer. The Megaco application layer is connected to the media resource according to the information of the media resources.

The peer protocol stack is used between the signaling plane of the MSCe and the signaling plane of the BSC. In the embodiment of the present invention, the BSSAP application and the Megaco application are combined in the BSC, the BSSAP application and the Megaco application may be processed in a processing board.

The MGW/MRFP is set in the BSC in this embodiment, traffic data may be routed to the Media Gateway of the destination BSC, the local Gateway MSC or the fixed network according to the IP address in the traffic plane of BSC directly.

As the destination IP address of traffic data is obtained, the signaling plane sends the obtained destination IP address to the traffic plane. The BSC traffic plane has obtained the destination IP address and port to which traffic data to be sent, and the traffic data is received from an MS through a channel at radio side. The destination IP address may be IP address of an MGW of another BSC, other Gateway or fixed network. In the traffic plane, the format of the traffic data may be G.711. The format of the traffic data may be determined during the interaction between the signaling planes. The processing for a data packet of the traffic plane is similar with the processing in media gateway, the data packet of the traffic plane is processed by the RTP layer and the UDP layer, and an IP header is added to the data packet in the IP layer. The data packet is transmitted through a link layer and a physical layer. Destination IP address and port are contained in the IP header.

In this embodiment, the data packet may be sent to the destination entity in the IP bearer network. The destination entity receives the data packet from the corresponding IP address and port, and sends the data packet to the destination MS by a corresponding radio side channel according to the information got by the interaction of the signaling plane. In this embodiment, the exchange number of an IP packet may be reduced.

The processing of transmitting traffic data in this embodiment is hereinafter described as an example:

MS1 within the coverage area of BTS11 communicates with MS2 within the coverage area of BTS22. As traffic data received is processed in the media gateway control application layer, BSC1 obtains the destination IP address of traffic data, i.e. the IP address of BSC2. The BSC1 routes the traffic data to the destination device directly according to the IP address of BSC2 in the traffic plane. The BSC1 receives the traffic data sent by MS1, adds the IP address of the BSC2 in the traffic data, and sends the traffic data added with the IP address of the BSC2 to the BSC2. The BSC2 then delivers the traffic data added with the IP address of the BSC2 to the MS2 via the BTS22.

Figure 8:
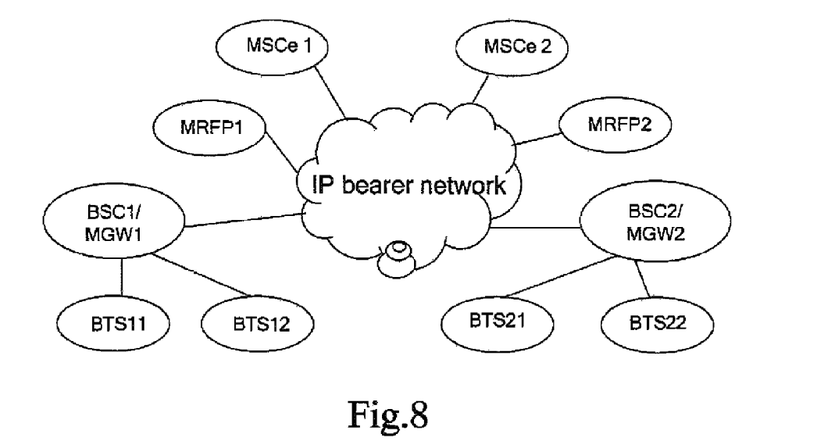
FIG. 8 is a schematic diagram illustrating the physical architecture of a radio access system in accordance with another embodiment of the present invention.

FIG. 8 is a schematic diagram illustrating a physical architecture of a radio access system in accordance with another embodiment of the present invention. In this embodiment, the functions of BSC and MGW are combined into one physical entity named as BSC; the: MRFP is set independently. The device entities such as MSCe, BSC and MRFP, are connected to the IP bearer network via routers. As the MRFP is set independently, each MRFP has its own IP address. When a service needs to use media resources of an MRFP, it is only necessary to route the service to the MRFP according to the IP address of the MRFP. The MRFP is shared between multiple BSCs within one MSCe. The MRFP may be shared between multiple MSCes by defining a public protocol for interaction between MSCe and MRFP.

Figure 9:
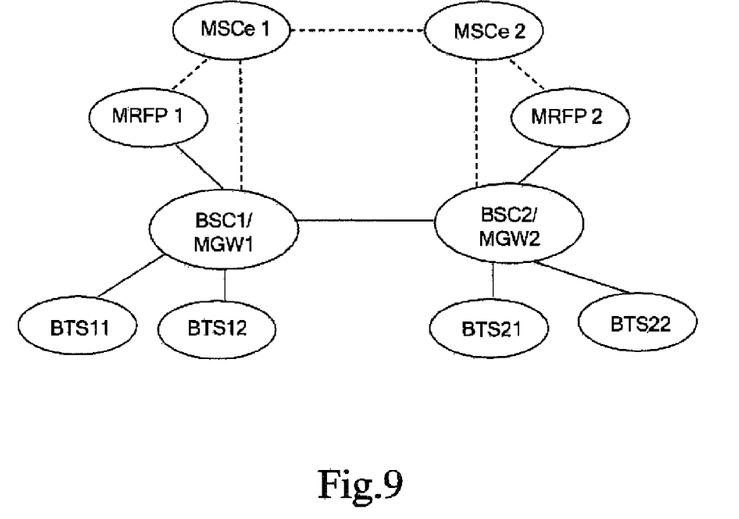
FIG. 9 is a schematic diagram illustrating the logical architecture of the system shown in FIG. 8.

FIG. 9 is a schematic diagram illustrating the logical architecture of the system as shown in FIG. 8. In FIG. 9, the dashed line represents signaling connection and the solid line represents traffic data connection. As shown in FIG. 9, connections between MSCes, connections between MSCe and BSC, and connections between MSCe and MRFP are mainly signaling connections. Connections between BSCs, and connections between BSC and MRFP are mainly traffic data connections.

Figure 10:
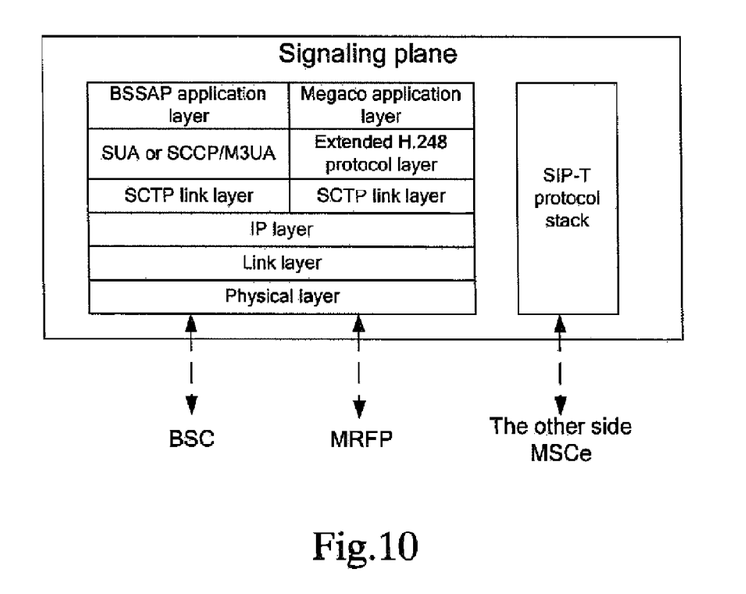
FIG. 10 is a schematic diagram illustrating the logical architecture of MSCe in accordance with the embodiment shown in FIG. 8.

FIG. 10 is a schematic diagram illustrating the logical architecture of MSCe in accordance with the embodiment as shown in FIG. 8. The logical architecture of MSCe in this embodiment is similar to that shown in FIG. 6. In this embodiment, the MRFP is set as an independent physical entity; the H.248 protocol standard is correspondingly extended to add interaction with the MRFP. The MSCe controls the BSC to get a relevant media resource service such as the playing announcement resource, conference call resource etc. The method for the MSCe to get the relevant media resource service includes: the MSCe sends a signaling message to the BSC. The signaling message notifies the BSC to connect the IP address and port designated by the MRFP, wherein the signaling message carries session description information including IP address and port.

Figure 11:
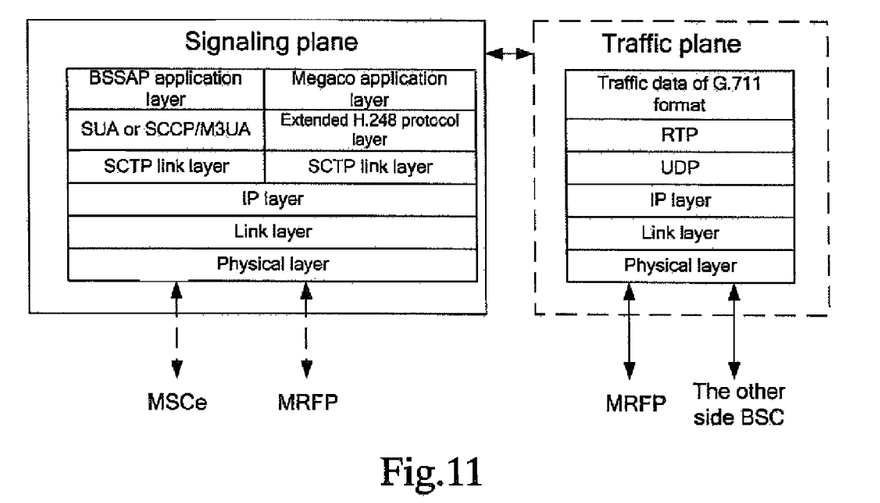
FIG. 11 is a schematic diagram illustrating the logical architecture of BSC in accordance with the embodiment shown in FIG. 8.

FIG. 11 is a schematic diagram illustrating the logical architecture of BSC in accordance with the embodiment as shown in FIG. 8. The logical architecture of BSC in this embodiment is similar to the logical architecture of BSC in the embodiment as shown in FIG. 8. The logical architecture of BSC in this embodiment includes a signaling plane protocol stack and a traffic plane protocol stack.

In this embodiment, the BSC of this embodiment includes a signaling plane protocol stack and a traffic plane protocol stack without an MRFP. And an extended H.248 protocol is used in the signaling plane protocol stack to perform a protocol interaction with the MRFP. The traffic plane protocol stack is similar to the traffic plane protocol stack in the embodiment shown in FIG. 7. The destination device may be the MRFP in this embodiment. And the destination IF address may be IP address of the BSC or the MRFP. The data packet is processed in turn by the RTP layer and the UDP layer, and is transmitted after an IP header is added to the data packet in the IP layer, wherein the IP header contains a destination IP address and port.

In this embodiment, the signaling transmission and reception between MSCe and BSC is basically the similar to that of the embodiment shown in FIG. 4. In this embodiment, if the media resource (i.e. the playing announcement resource and conference call resource), is necessary for processing in the processing procedure of extended H.248 protocol layer, the MSCe may perform the following processes:

The MSCe sends a signaling message to the MRFP. The signaling message is used to notify the MRFP to prepare corresponding media resource. The signaling message carries relevant session description information of the BSC (SDP-bsc). The SDP-bsc includes IP address and port of the BSC. As the media resource is ready, the MRFP returns session description information of the MRFP (SDP-mrfp) to the MSCe. The SDP-mrfp includes IP address and port of media resource. The SDP-mrfp is used for connecting the media resource externally. The MSCe sends the SDP-mrfp to the BSC. As connecting to the corresponding IP address and port of MRFP in the traffic plane, the BSC gets the corresponding media resource service.

The signaling transmission between MSCe and MRFP is the similar to the signaling transmission between MSCe and MGW. As the media resource is needed, the MSCe creates a signaling message in the processing procedure of the application layer. The signaling message is processed in turn by the H.248 layer, the SCTP layer and the IP layer. An IP header is added to the signaling message, and the destination address in the IP header is the IP address of MRFP signaling plane. The MSCe sends the signaling message to the MRFP over an IP bearer network. As receiving the signaling message, the MRFP sends the signaling message to the application layer through the IP layer, the SCTP layer and the H.248 layer in turn. The procedure for the MRFP sending a signaling message to the MSCe is similar to the procedure mentioned above.

In this embodiment, the H.248 signaling should be extended. The extended H.248 signaling includes: the signaling for the MSCe carrying t session description information of the MRFP (SDP-mrfp) to the BSC, wherein the SDP-mrfp includes IP address and port of MERP; and the signaling for the MSCe carrying session description information of the BSC (SDP-bsc) to the MRFP, wherein the SDP-bsc includes IP address and port of BSC.

Figure 12:
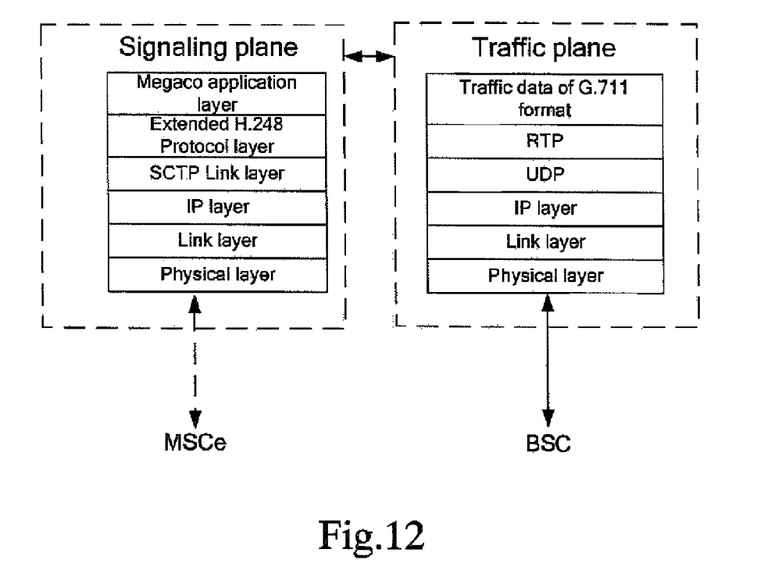
FIG. 12 is a schematic diagram illustrating the logical architecture of MRFP in accordance with the embodiment shown in FIG. 8.

FIG. 12 is a schematic diagram illustrating the logical architecture of an MRFP in accordance with the embodiment as shown in FIG. 8. The MRFP contains a signaling plane protocol stack and a traffic plane protocol stack. The signaling plane protocol stack includes an application layer, an extended H.248 protocol layer, an SCTP link layer, an IP layer, a link layer and a physical layer. The traffic plane protocol stack is similar to the traffic plane protocol stack of the embodiment shown in the FIG. 8.

The application layer of the MRFP signaling plane in this embodiment is mainly used for allocating media resource. The application layer of the MRFP signaling plane communicates with MSCe over the extended H.248 protocol layer.

In this embodiment, the protocol stack of the MRFP traffic plane is used for transmitting data with the BSC.

The procedure for sending and receiving traffic data between MRFP and BSC is hereinafter described.

As the participation of the MSCe, the media resource has been prepared in the MRFP, and the relevant information such as IP address and port to be connected has been obtained by the BSC.

For the playing announcement resource, as the data packet is processed in turn by the RTP layer and the UDP layer, and an IP header is added to the data packet in the IP layer, the MRFP sends the data packet to the IP bearer network. And the IP header includes an IP address and port of destination BSC. The data packet may be sent to the destination BSC in the IP bearer network. The destination BSC receives the data packet from the IP address and port, and sends the data packet to the destination MS over a corresponding radio side channel according to information got by the interaction between the signaling plane and MSCe. The MS receives the playing announcement.

For the conference call resource, as the data packet is processed in turn by the RTP layer and the UDP layer, and an IP header is added to the data packet in the IP layer, the BSC sends the data packet to a destination MRFP. The data packet is transmitted to the MRFP over the IP bearer network, wherein the IP header includes the IP address and port of destination MRFP. The destination MRFP receives the data packet from the IP address and port. The data packet is transmitted to the corresponding resource processor for audio mixing processing according to the information got by the interaction between the signaling plane and MSCe. The procedure for an MRFP sending a data packet to a BSC is similar as the procedure mentioned above.

The above embodiments are about the CDMA2000 system, which is also adapted to the WCDMA system. In the CDMA2000 system, the radio access control device is a BSC, wherein the radio access control device in WCDMA system is a BSC or an RNC. The MSC serving device in CDMA2000 system is an MSCe, wherein the MSC serving device in WCDMA system is an MSC server.

In the embodiments of the present invention, as a media gateway device is not required in the system, the exchange number of an IP packet is reduced. As a configuration for separating a radio access control device from an MSC serving device, the embodiments of the present invention also keep the advantage for separating bearer from control.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown but is to be accorded the widest scope consistent with the principles and features disclosed in the present invention.

What is claimed is:

1. A method for implementing media gateway function, comprising:
   receiving a first signaling message, wherein the first signaling message is generated by a Mobile Switching Center (MSC) serving device in the processing of the base station application layer or the processing of the media gateway control application layer of the MSC serving device, and is sent by the MSC serving device;
   determining to perform a processing of a base station application layer or a processing of a media gateway control application layer according to a source Internet Protocol (IP) address and port as well as a destination IP address and port of a Simple Control Transmission Protocol (SCTP) link, wherein the SCTP link is indicated by the first signaling message;
   obtaining a destination IP address of traffic data;
   if it is determined that the processing of the media gateway control application layer is to be performed, routing the traffic data to a destination device according to the destination IP address of the traffic data;
   receiving a notification signaling message sent by the MSC serving device in a processing procedure of an H.248 protocol layer;
   connecting to a Media Resource Function Processor (MRFP) of a media gateway according to the session description information including the IP address and port of the media resource received from the MRFP to obtain a media resource;
   notifying the MRFP of preparing the media resource before receiving the notification signaling message sent by the MSC serving device; and
   returning session description information including IP address and port of the media resource to the MSC serving device upon the media resource being prepared,
   wherein the notification signaling message comprises: the session description information including IP address and port of the media resource received from the MRFP.

2. A radio access system, comprising:
   a radio access control device;
   a Mobile Switching Center (MSC) serving device connected to the radio access control device; and
   a Media Resource Function Processor (MRFP);
   wherein a Simple Control Transmission Protocol (SCTP) link layer of the radio access control device is configured for determining to transmit a first signaling message received from an external device to a base station application layer or a media gateway control application layer of the radio access control device for processing, according to an SCTP link indicated by the first signaling message,
   wherein the media gateway control application layer of the radio access control device is configured for receiving the first signaling message sent from the SCTP link layer, performing a processing of the media gateway application layer,
   wherein a traffic plane of the radio access control device is configured for routing traffic data to a destination device upon the processing of the media gateway application layer,
   wherein the radio access control device of the system further comprises an H.248 protocol layer,
   wherein the SCTP link layer sends the first signaling message to the H.248 protocol layer for processing, and the H.248 protocol layer sends the first signaling message processed to the media gateway control application layer,
   wherein the H.248 protocol layer of the radio access control device is further configured for receiving a notification signaling message from the MSC serving device,
   wherein the radio access control device is connected to the MRFP to obtain a media resource connection according to the notification signaling message, and
   wherein the MSC serving device obtains media resource information through interacting with the MRFP, and adds the media resource information to the notification signaling information.

* * * * *